United States Patent [19]

Brewbaker et al.

[11] 4,151,219

[45] Apr. 24, 1979

[54] VINYL ESTER RESINS CONTAINING POLYOXYALKYLENE LOW PROFILE ADDITIVES

[75] Inventors: James L. Brewbaker, Midland; William A. Sprenger, Coleman, both of Mich.

[73] Assignee: The Dow Chemical Company, Midland, Mich.

[21] Appl. No.: 899,921

[22] Filed: Apr. 26, 1978

Related U.S. Application Data

[63] Continuation-in-part of Ser. No. 795,977, May 11, 1977, abandoned.

[51] Int. Cl.$^2$ .............................................. C08L 63/00
[52] U.S. Cl. .............................. 260/836; 260/37 EP; 260/830 R; 260/837 R
[58] Field of Search ............................ 260/836, 837 R

[56] References Cited

U.S. PATENT DOCUMENTS

| | | | |
|---|---|---|---|
| 3,367,992 | 2/1968 | Bearden | 260/837 R |
| 3,466,259 | 9/1969 | Jernigan | 260/836 |
| 3,674,893 | 7/1972 | Nowak | 260/837 R |
| 3,836,600 | 9/1974 | Brewbaker | 260/837 R |
| 3,976,615 | 8/1976 | Sekmakas | 260/837 R |

*Primary Examiner*—Paul Lieberman

[57] ABSTRACT

Low shrink and low profile reinforced plastic systems are prepared from vinyl ester resins by incorporating therein an additive having the formula:

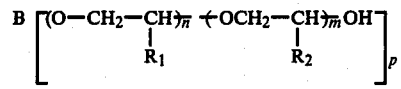

wherein $R_1$ and $R_2$ are hydrogen, methyl or ethyl with the provision that, if either $R_1$ or $R_2$ is hydrogen, the other is methyl or ethyl, n and m are whole numbers such that said additive is soluble in said resin when uncured and insoluble in said resin when cured; and B is the residue of a hydroxyl containing initiating compound. Typical of such compounds are water, ethylene glycol, glycerine and phenol. The value of p is equal to or less than the number of hydroxyls in the initiating compound.

3 Claims, No Drawings

VINYL ESTER RESINS CONTAINING POLYOXYALKYLENE LOW PROFILE ADDITIVES

REFERENCE TO COPENDING APPLICATION

This application is a continuation-in-part of our copending application having U.S. Ser. No. 795,977 and filed May 11, 1977, now abandoned.

BACKGROUND OF THE INVENTION

The advent of low shrink-low profile additives has led to a considerable growth in sheet molding compounds and bulk molding compounds. Previous to the development of those additives, reinforced molded parts had rippled or undulating surfaces, which required laborious sanding operations or other corrective measures to obtain painted parts with a metal-like appearance. The low shrink-low profile additives exhibited great benefits to providing exceptionally smooth surfaces. However, those resin systems containing such additives introduced processing difficulties and other disadvantages.

THE PRIOR ART

U.S. Pat. No. 3,836,600 teaches the use of a polyalkylene oxide stabilizer to provide improvement in the stability of a thermosettable resin composition containing a thermoplastic resin as an additive to give smooth surfaces.

U.S. Pat. No. 3,674,893 relates to a vinyl ester resin composition containing an unsaturated polydiene rubber as a property improving additive.

U.S. Pat. No. 3,857,812 is similar to U.S. Pat. No. 3,674,893 but relates to polyesters.

U.S. Pat. No. 3,232,893 adds a poly(ethylene/propylene)glycol surfactant in a polyester foamable composition.

U.S. Pat. No. 3,737,405 adds di- or tripropylene glycol plus talc to a polyester/monomer mixture to improve adhesion.

U.S. Pat. No. 3,673,132 teaches a polyester foam containing a glycol in the pores.

U.S. Pat. No. 3,701,748 relates to a composition of a polyester and a polymer which is soluble in the uncured composition but results in a heterogeneous mix during curing.

SUMMARY OF THE INVENTION

The present invention involves a thermosettable vinyl ester resin composition comprising a vinyl ester resin and from about 2 to about 60 weight percent of a low shrink-low profile polyoxyalkylene additive that is soluble in the uncured vinyl ester resin but insoluble in the cured resin system.

DESCRIPTION OF THE INVENTION

The low shrink-low profile additives useful in the present invention are polyoxyalkylene glycols having the formula:

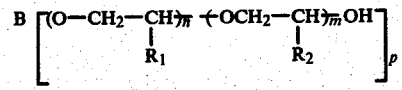

wherein $R_1$ and $R_2$ are hydrogen, methyl or ethyl with the provision that if either is hydrogen the other is methyl or ethyl; n and m are whole numbers such that said additive is soluble in the vinyl ester resin when uncured and insoluble in said resin when cured; and B is the residue of a hydroxyl containing initiating compound. Typical of such compounds are water, ethylene glycol, glycerine and phenol. The value of p is equal to or less than the number of hydroxyls in the initiating compound.

Typical examples of useful glycols include the polypropylene glycols having a number average molecular weight of at least 1,000. Also useful are the copolymers of propylene oxide and ethylene oxide. The minimum molecular weight of those copolymers will vary with the mole ratio of the ethylene oxide to propylene oxide. The requisite minimum molecular weight in any ratio is that wherein the copolymer is soluble in the uncured resin and insoluble in the cured resin. Above about 75 mole percent ethylene oxide the copolymers are too soluble in the cured resin at any practically attainable molecular weight to be useful. With other ratios the minimum molecular weight for use herein will be able to be determined easily by simple preliminary experiments.

Representative species of inoperable additives are the polyethylene glycols which are soluble both in the uncured and cured resin even at a molecular weight as high as 20,000. Also polybutylene glycol, polystyrene, polymethylmethacrylate and a copolymer of 60 percent butadiene and 40 percent styrene are inoperable in the concept of this invention because each is insoluble in both the uncured and cured resins.

The resin system for which the low shrink, low profile additive is especially useful includes a terminally unsaturated vinyl ester resin in admixture with at least one copolymerizable monomer. Generally, the resins are mixed with styrene for thermally cured reinforced articles but for radiation cure other monomers are more preferable such as the alkylacrylates or the hydroxyalkyl acrylates. Mixtures of polyesters and vinyl esters are also contemplated. Generally, the resin comprises from 25 to 70 weight percent of the mixture and the monomer about 30 to 75 weight percent.

Terminally unsaturated vinyl ester resins are prepared by reacting about equivalent proportions of a polyepoxide resin and an unsaturated monocarboxylic acid wherein

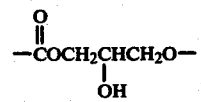

linkages are formed and the resulting resin has terminal, polymerizable unsaturated groups. For example, two equivalents of methacrylic acid may be reacted with two equivalents of a polyepoxide resin to produce a vinyl ester resin. Although the low profile additives are effective with a wide variety of vinyl ester resins, they generally do not improve the profile to an acceptable level with vinyl ester resins that have been chemically thickened with conventional thickeners, such as MgO or CaO.

Vinyl ester resins are described in U.S. Pat. No. 3,367,992 to Bearden wherein dicarboxylic acid half esters of hydroxyalkyl acrylates or methacrylates are reacted with polyepoxide resins. Bowen in U.S. Pat. Nos. 3,066,112 and 3,179,623 describes the preparation of vinyl ester resins from monocarboxylic acids such as acrylic and methacrylic acid. Bowen also describes an alternate method of preparation wherein a glycidyl methacrylate or acrylate is reacted with the sodium salt of a dihydric phenol such as bisphenol A. Vinyl ester resins based on epoxy novolac resins are described in U.S. Pat. No. 3,301,743 to Fekete et al. Fekete et al. also described in U.S. Pat. No. 3,256,226 vinyl ester resins wherein the molecular weight of the polyepoxide is increased by reacting a dicarboxylic acid with the polyepoxide resin as well as acrylic acid, etc. Other difunctional compounds containing a group which is reactive with an epoxide group, such as amine, mercaptan, and the like, may be utilized in place of the dicarboxylic acid. All of the above-described resins which contain the characteristic linkages.

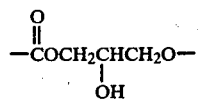

and terminal, polymerizable unsaturated groups, are classified herein as vinyl ester resins. The preparation of vinyl ester resins is fully disclosed in the above patents.

Briefly, any of the known polyepoxides may be employed in the preparation of the vinyl ester resins of this invention. Useful polyepoxides are glycidyl polyethers of both polyhydric alcohols and polyhydric phenols, flame retardant epoxy resins based on tetrabromo bisphenol A, epoxy novolacs, epoxidized fatty acids or drying oil acids, epoxidized diolefins, epoxidized diunsaturated acid esters as well as epoxidized unsaturated polyesters, so long as they contain more than one oxirane group per molecule. The polyepoxides may be monomeric or polymeric.

Preferred polyepoxides are glycidyl polyethers of polyhydric alcohols or polyhydric phenols having weights per epoxide group of about 150 to 2,000. These polyepoxides are usually made by reacting at least about 2 moles of an epihalohydrin or glycerol dihalohydrin with 1 mole of the polyhydric alcohol or polyhydric phenol, and a sufficient amount of a caustic alkali to combine with the halogen of the halohydrin. The products are characterized by the presence of more than one epoxide group per molecule, i.e., a 1,2-epoxy equivalency greater than one.

Unsaturated monocarboxylic acids include acrylic acid, methacrylic acid, halogenated acrylic or methacrylic acids, cinnamic acid and the like and mixtures thereof, and hydroxyalkyl acrylate or methacrylate half esters, of dicarboxylic acids as described in U.S. Pat. No. 3,367,992 wherein the hydroxyalkyl group preferably has from two to six carbon atoms.

A variety of copolymerizable monomers are available and suitable and include alkenyl aromatic monomers, alkyl esters of acrylic and methacrylic acid, vinyl acetate, acrylonitrile, diallyl maleate, diallyl phthalate, acrylic and methacrylic acid and the like and mixtures thereof. Preferred are the alkenyl aromatic monomers such as styrene, α-methyl styrene, vinyl toluene, alkyl substituted styrenes such as t-butyl styrene, etc., halogen substituted styrenes such as chlorostyrene, dichlorostyrene and the like.

In preparing reinforced articles the thermosettable compositions are usually mixed with glass fibers in any of its various forms, such as mats, fabrics, continuous strand, chopped roving and the like. Other reinforcements such as asbestos fibers, nylon fibers, and polyester fibers may also be used.

The resin compositions of the invention are readily prepared by merely combining in any convenient order the desired components and mixing to adequately dissolve the low profile additive. Gentle to moderate mixing with mechanical mixers and stirrers is sufficient.

The thermosettable compositions herein may be readily cured by exposure to ionizing radiation or by admixture with free radical yielding initiators, such as peroxides, persulfates and the like. With initiators the cure may be accelerated by heating up to about 150° C. or higher and also, if desired, by the addition of accelerating agents, such as metal naphthenates, dimethyl toluidine and the like.

The invention will be further illustrated by the following nonlimiting examples. All parts and percentages are by weight unless otherwise specified.

EXAMPLE 1

A vinyl ester resin, herein designated Resin A, was prepared by mixing about 16 parts of a diglycidyl ether of bisphenol A (molecular weight built up to EEW of 275 with bisphenol A) and 26 parts of an epoxy novolac resin (DEN 438) and reacting 18 parts of methacrylic acid therewith followed by reaction with 6 parts maleic anhydride and cooked to about 5 percent acid. The resin was diluted with 33 parts styrene.

A resin formulation was prepared according to the following recipe:

| | |
|---|---|
| Resin A | 65 parts |
| 37.5 percent solution of low profile additive | 35 parts |
| t-butyl peroctoate | 1 part |
| Zelec UN | 0.5 part |
| Camel Wite CaCO$_3$ | 100 parts |

In addition when polystyrene and polystyrene-cobutadiene were used as the additives, the formulation contained 1.47 parts of a 34 percent styrene solution of a poly(ethylene oxide-b-styrene) as an emulsifier.

These formulations were wet molded using a stack of two layers of 2 oz. continuous strand glass mat (Owens Corning M-8600) covered on the top with two layers of veil mat (Modiglass 0.01SSM). Flat trays measuring 10¼×16¼×0.10 in. were molded at 300° F. and 300 psi for 90 sec. in a steel die set. The final composite contained 25 weight percent glass. The surface smoothness of each tray was measured on the veil mat side using a Micrometrical Type RAE profilometer. The measurements were taken over a 2.5 in. scan. The complete scan was divided into five 0.5 in. segments. The surface smoothness values shown are the average of the maximum surface deviation within each segment.

The results are shown in the following table.

TABLE I

| Sample | Low Profile Additive | Surface Smoothness |
|---|---|---|
| A | Polystyrene | 264 microinches |
| B | Polymethylmethacrylate | 224 microinches |
| C | Poly(Styrene/butadiene) | 258 microinches |
| This Invention | | |
| D | Poly(propylene oxide) (~4000 molecular weight) | 142 microinches |

EXAMPLE 2

Resin compositions were prepared using the vinyl ester resin of Example 1, styrene, and various low profile ingredients in a weight ratio of 42.25 parts vinyl ester resin/44.625 parts styrene/13.125 parts additive. The resin was formulated into a filled molding compound and molded into trays according to the procedure described in Example 1.

The edges were cut from the trays and the reverse impact strengths of the cured panels measured by dropping a 1 pound steel ball on the panel from various heights. The opposite side of the panel was inspected for cracks by covering the area with an indicating ink then wiping the excess ink away. Any cracks present remained stained by the ink and were visible within the white panels. The greatest height in inches from which the ball could be dropped without causing cracking in the panel was the reverse impact strength.

The results are shown in the following table

TABLE II

| Sample | Low Profile Additive | Reverse Impact Strength (In.) |
| --- | --- | --- |
| E | Polystyrene | <4 |
| F | Poly(methyl methacrylate) | 5 |
| G | Poly(propylene oxide) (~4000 molecular weight) | 17 |

EXAMPLE 3

Resin compositions were made with three different vinyl ester resins. One resin was Resin A. Resin B was the diacrylate of the diglycidyl ether of bisphenol A further reacted with 1.5 percent maleic anhydride and cooked to 2 percent acid. Forty-five percent styrene was added.

Resin C was prepared from a recipe containing 9.8 parts of the diglycidyl ether of bisphenol A and 27.9 parts of the epoxy novolac resin (DEN 438) with 17.25 parts methacrylic acid. The resin was dissolved in 45 percent styrene.

Some of the resins were employed to make test specimens according to the recipe of Example 1 but without any low profile additive. Others were formulated with 13 percent polypropylene oxide (molecular weight=4000) in addition to the other ingredients. The test specimens were prepared as in Example 1 and the surface profile determined. The results are shown in the following table.

TABLE III

| | Surface Profile (microinches) | |
| --- | --- | --- |
| Resin | No Additive | 13% polyPO |
| A | 745 | 130 |
| B | 836 | 284 |
| C | 605 | 177 |

EXAMPLE 4

Several compositions were prepared using the recipe of Example 1 but with various different additives. The compositions were molded into test specimens and the surface profiles determined. The results are listed in Table IV.

TABLE IV

| Polyether Composition | Surface Profile (microinches) |
| --- | --- |
| None | 992 |
| Polypropylene oxide (MW=2000) | 232 |
| Polypropylene oxide (MW=4000) | 122 |
| Poly(0.9 propylene oxide-0.1 ethylene oxide) | 274 |
| Poly(0.86 propylene oxide-0.14 ethylene oxide) | 243 |

What is claimed is:

1. A thermosettable composition comprising a mixture of (a) a terminally unsaturated vinyl ester resin comprising the reaction product of an unsaturated monocarboxylic acid with a polyepoxide, (b) at least one vinyl monomer copolymerizable therewith; and (c) a polyoxyalkylene low profile additive having the formula:

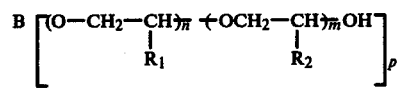

wherein $R_1$ and $R_2$ are hydrogen, methyl or ethyl with the provision that when either is hydrogen the other must be methyl or ethyl; B is the residue of a hydroxyl containing initiating compound with the value of p equal to or less than the number of hydroxyls in the initiating compound, and m and n are whole numbers such that said additive is soluble in said vinyl ester resin when uncured and insoluble in the cured resin.

2. The resin composition of claim 1 containing from 7 to 16 weight percent polypropylene oxide having a molecular weight of 2000.

3. The resin composition of claim 1 containing from 4 to 16 weight percent of polypropylene oxide having a molecular weight of 4000.